United States Patent [19]
Khangura et al.

[11] Patent Number: 5,539,260
[45] Date of Patent: Jul. 23, 1996

[54] METHOD AND APPARATUS FOR AN AUTOMOTIVE SECURITY SYSTEM WHICH PERMITS ENGINE RUNNING PRIOR TO CODE COMPARISON

[75] Inventors: Kanwaljit S. Khangura, Shenfield, England; William D. Treharne, Dearborn Heights; Ronald G. Moore, Troy, both of Mich.

[73] Assignee: Ford Motor Company, Dearborn, Mich.

[21] Appl. No.: 270,979

[22] Filed: Aug. 29, 1994

[51] Int. Cl.⁶ .................................. B60R 25/00
[52] U.S. Cl. .............. 307/10.3; 180/287; 340/825.72
[58] Field of Search ............... 307/9.1–10.6; 180/287, 289; 70/237, 277, 228, 252, 370; 340/425.5, 426, 825.3–825.32, 825.34, 825.44, 825.54, 825.69, 825.72; 123/198 DB, 198 DC

[56] References Cited

U.S. PATENT DOCUMENTS

| | | | |
|---|---|---|---|
| 3,430,058 | 2/1969 | Yoshida | 307/10.4 |
| 3,559,757 | 2/1971 | Weiss et al. | 180/287 |
| 3,610,943 | 10/1971 | Jones | 307/10.4 |
| 3,634,724 | 1/1972 | Vest | 180/287 |
| 3,698,505 | 10/1972 | Webley | 180/287 |
| 3,710,316 | 1/1973 | Kromer | 307/10.4 |
| 4,004,273 | 1/1977 | Kalogerson | 307/10.2 |
| 4,133,410 | 1/1979 | Krusoe | 123/198 B |
| 4,148,372 | 4/1979 | Schroeder | 180/287 |
| 4,175,635 | 11/1979 | Thomas | 180/287 |
| 4,236,594 | 12/1980 | Ramsperger | 180/271 |
| 4,286,683 | 9/1981 | Zeigner et al. | 290/38 E |
| 4,371,051 | 2/1983 | Achterholt | 123/198 DB |
| 4,452,197 | 6/1984 | Weber | 180/287 |
| 4,585,772 | 12/1984 | Uchida et al. | 123/198 DB |
| 4,691,801 | 9/1987 | Mann et al. | 180/287 |
| 4,878,050 | 10/1989 | Kelley | 340/426 |
| 4,892,167 | 1/1990 | Tejeda | 180/287 |
| 4,992,670 | 2/1991 | Pastor | 180/287 |
| 5,023,605 | 6/1991 | McColl | 307/10.5 |
| 5,024,186 | 6/1991 | Long et al. | 307/10.6 |
| 5,072,703 | 12/1991 | Sutton | 307/10.6 |
| 5,315,286 | 5/1994 | Nolan | 180/287 |
| 5,444,430 | 8/1995 | McShane | 307/10.2 |

*Primary Examiner*—William M. Shoop, Jr.
*Assistant Examiner*—Richard T. Elms
*Attorney, Agent, or Firm*—Kevin G. Mierzwa

[57] ABSTRACT

A security system for an automotive vehicle having an engine is operatively connected between engine running electrical components which are connected to an electrical power source and a lock switch having at least two operative positions. The security system has a lock switch operator having a memory device carried thereon with a first security code stored in the memory device. A theft control module having a memory storing a second security code is operatively connected between the switch and the engine running electrical devices. The theft control module operates to first permit the engine running electrical components to enable the starting of the engine and then to compare the first and second security codes. Upon finding the first security code not equal to the second security code, the engine running electrical components are disconnected from the electrical power source which disables the engine.

20 Claims, 2 Drawing Sheets

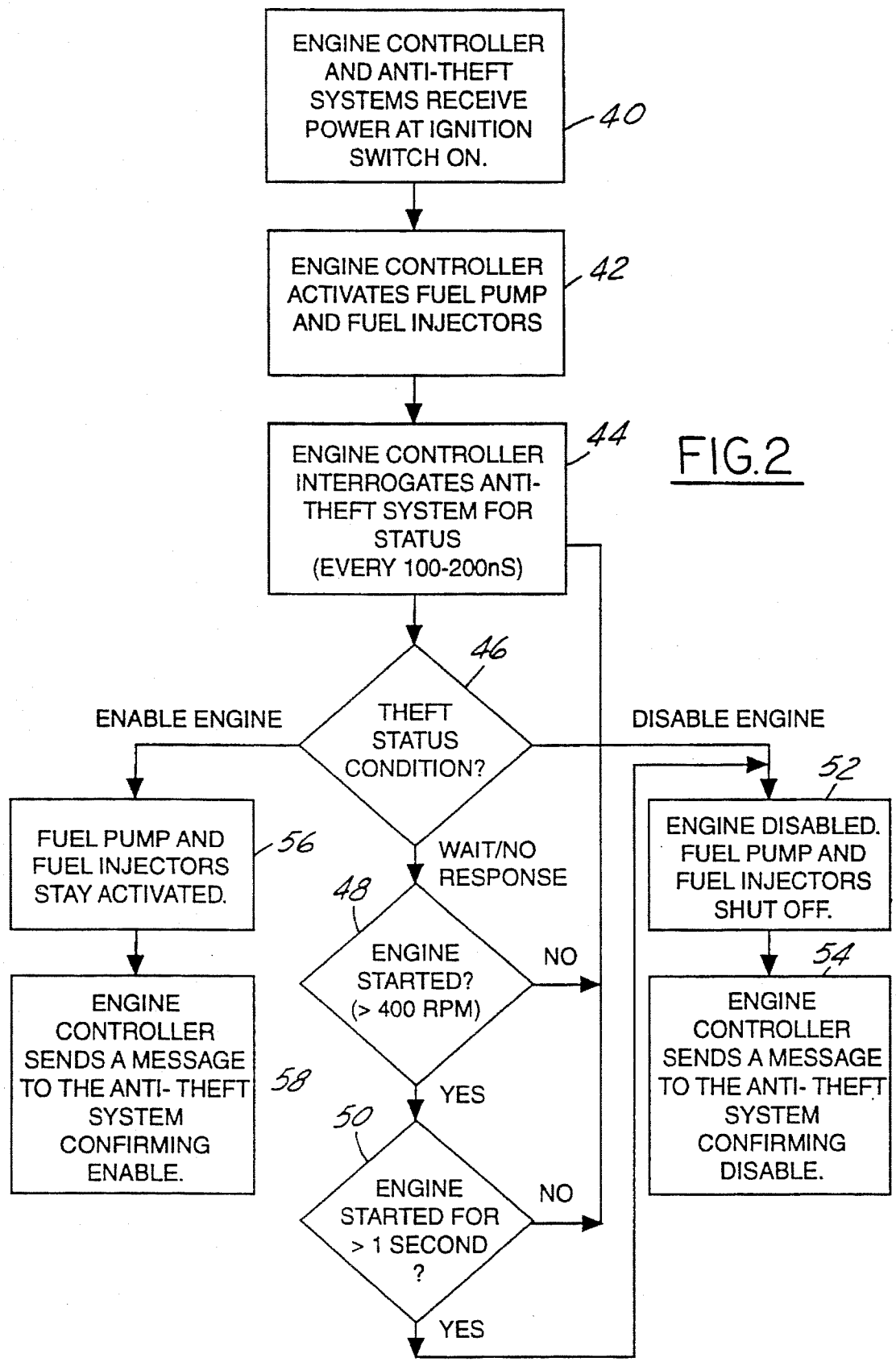

METHOD AND APPARATUS FOR AN AUTOMOTIVE SECURITY SYSTEM WHICH PERMITS ENGINE RUNNING PRIOR TO CODE COMPARISON

BACKGROUND OF THE INVENTION

The present invention relates generally to a key-activated security device for an automotive vehicle and more specifically to a method and apparatus controlling the operation of the security system.

Several security systems use two lines of defense. A first line of defense is a cut key which is used to operate the system if the cut of the key matches the lock in which it is inserted. A second line of defense is housing electronic circuitry on the key which has a unique identification code. When a properly cut key is inserted into the lock, a security device interrogates the electronic circuitry for its security code. If the security code is the proper lock operator, the engine is allowed to start.

The time between the interrogation of the electronic circuitry and the starting of engine may vary depending on such factors as humidity and temperature. One problem with prior security devices is that if the engine starts a long duration after turning the key in the lock, operators perceive a problem.

Another drawback with prior security devices is that the if the operator's vehicle does not start, no indication of the cause of the problem is indicated. In other words, the operator does not know whether the car is not starting because of a defective security system or whether the car is not starting because of a defect in the engine or associated components.

SUMMARY OF THE INVENTION

An object of the invention is to eliminate the delay between interrogating the key in the ignition and starting the engine due to the key interrogation time while still maintaining a high level of security.

The security system according to the preferred embodiment of the present invention is operatively connected between engine running electrical components which are connected to an electrical power source and a lock switch having at least two operative positions. The security system has a lock switch operator having a memory device carried thereon with a first security code stored in the memory device. A theft control module having a memory storing a second security code is operatively connected between the switch and the engine running electrical devices. The theft control module operates to first permit the engine running electrical components to enable the starting of the engine and then to compare the first and second security codes. Upon finding the first security code not equal to the second security code, the engine running electrical components are disconnected from the electrical power source which disables the engine.

One advantage of the present invention is that the electrical system of the automobile is given time to stabilize thereby allowing more accurate interrogation of an encoded key.

BRIEF DESCRIPTION OF THE DRAWINGS

FIG. 2 is a block diagram of the method for operating the security system according to the preferred embodiment of the invention.

DETAILED DESCRIPTION OF THE PREFERRED EMBODIMENT

Figure 1:
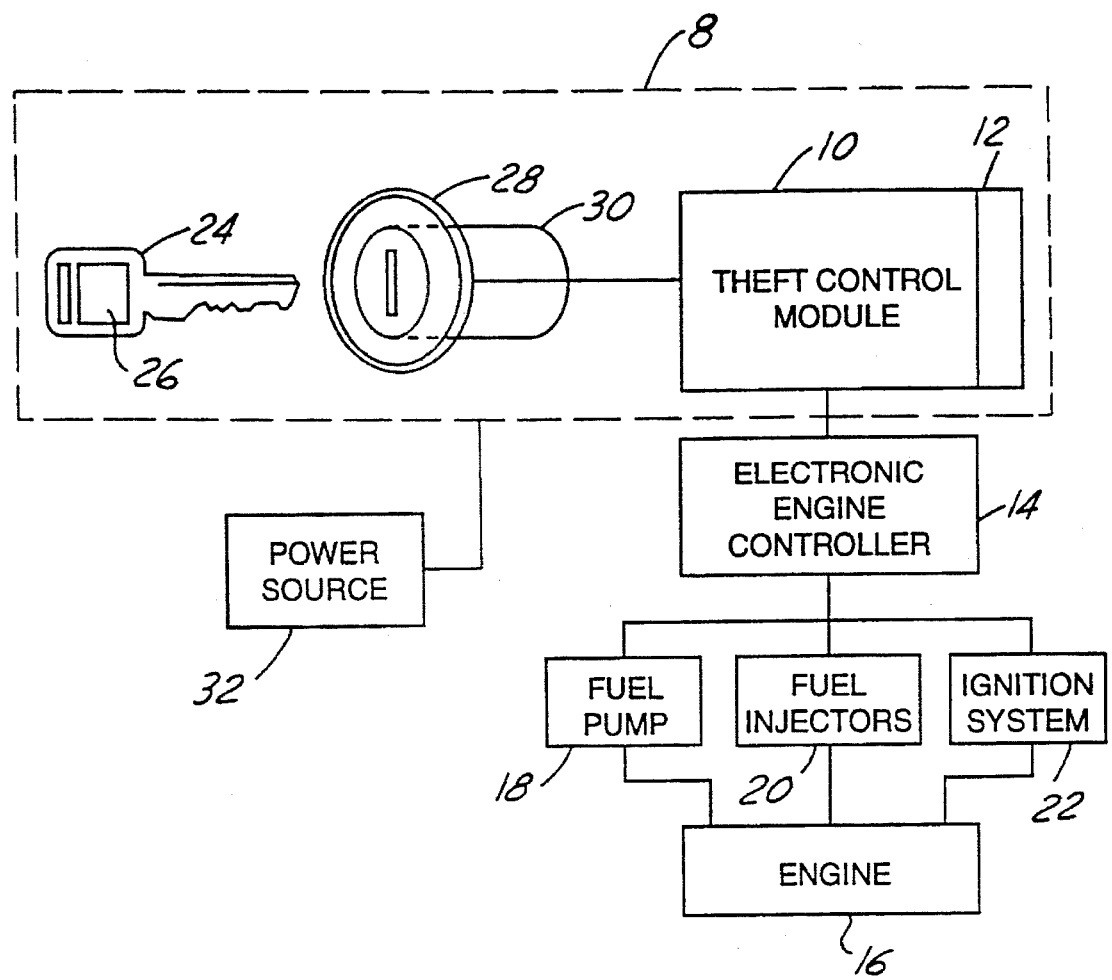
FIG. 1 is a block diagram of a security system according to the preferred embodiment of the invention.

Referring to FIG. 1, an security system 8 is connected to an electronic engine controller 14 and a power source 32. Electronic engine controller 14 receives power from power source 32 through security system 8. Security system 8 has a theft control module 10 having a memory 12. Theft control module 10 is connected to an antenna 28 located around a lock switch 30 and is used to transmit and receive information to an electronic memory device such as a transponder 26 located on a key 24.

Theft control module 10 is preferably microprocessor-based and has a variety of inputs and outputs for receiving and transmitting electrical signals. Memory 12 of theft control module 10 stores a security code. Memory 12 is preferably a read only memory.

Theft control module 10 is connected to electronic engine controller 14 which is also preferably microprocessor-based. Electronic engine controller 14 controls the functioning of an engine 16 by controlling power to engine running electrical components such as a fuel pump 18, fuel injectors 20, and an ignition system 22. Theft control module 10 and electronic engine controller 14 communicate using a series of control signals. As further described in conjunction with FIG. 2 below, theft control module 10 provides a signal representing theft control status to electronic engine controller 14 consisting of engine disable and engine enable control signals. Theft control module 10 preferably uses an encoded digital control signal which is unique to each system. Providing a unique digital control signal decreases the opportunity for defeating the system by disconnecting theft control module 10 from electronic engine controller 14 and providing a simulated control signal in place of a signal sent from theft control module 10.

Carried upon key 24 is an electronic memory device which stores a security code. In the illustrated preferred embodiment the electronic memory device is a transponder 26. Key 24 is used to operate lock switch 30. Theft control module 10 sends an interrogating signal to antenna 28 which is located proximate to the lock switch 30. Lock switch 30, for example, is preferably a commonly known rotatable ignition switch having at least two positions, e.g., an "off" and an "on" position. Lock switch 30 can also provide several positions commonly used in ignition switch such as a start position and an accessory position. When lock switch 30 is in the "on" position, power source 32 supplies power to theft control module 10 and electronic engine controller 14. Antenna 28 provides magnetic coupling to transponder 26 which energizes transponder 26 to transmit a security code via antenna 28 to theft control module 10. Theft control module 10 compares the security code received from transponder 26 to the security code stored in memory 12. If the received security code is not equal to the security code stored in memory 12 of theft control module 12, a disable engine control signal is sent to electronic engine controller 14.

Referring now to FIGS. 1 and 2, in block 40, key 24 is inserted into lock switch 30, key 24 is rotated to the "on" position (or a start position) which provides power to both theft control module 10 and electronic engine controller 14. In block 42, electronic engine controller 14 powers engine running electrical components such as fuel pump 18, fuel injectors 20 and ignition system 22. In block 44, electronic engine controller 14 interrogates theft control module 10 for the theft status condition. For example, electronic engine controller 14 between every 100 to 200 nsec.

In block 46, the theft status condition is checked for one of three conditions: if theft control module 10 has not responded, if theft control module 10 has responded and indicates enabling the engine or if theft control module 10 has responded and indicates disabling the engine.

If no response has been received from theft control module 10, the engine speed is checked in block 48 as to whether the engine speed is greater than a predetermined value corresponding to a value from which it will be known that the engine has started, e.g., 400 revolutions per second. If the engine has not responded and the engine speed is not over 400 RPM, the sequence returns to block 44. If the engine has reached 400 RPM, the sequence will proceed to block 50 where the length of time the engine is started is checked. If the engine has not been started for more than 1 second, the sequence will loop back to block 44. One second represents the time it takes transient electrical signals in the electrical system to significantly damp out of the system. More reliable readings of the security code on the key are taken after transient signals subside. If the engine has been started for more than 1 second, a disable sequence is entered. Such a situation is likely when, for instance, the connection from theft control module 10 to electronic engine controller is severed by tampering. In such a situation, the disable engine branch is executed beginning in block 52 (further described below).

Referring back to block 46, if theft control module 10 has responded and the theft condition status indicates is an engine disable status, the engine is disabled when a disable engine control signal is sent from theft control module 10 to electronic engine controller 14. In block 52, the engine is disabled by electronic engine controller 14 removing power to the engine running electrical components such as shutting down fuel pump 18 and fuel injectors 20. Thereafter, in block 54 a confirmation signal is sent from electronic engine controller 14 to theft control module 10. Referring back to block 46, if the theft status condition indicates an engine enable condition, the fuel injectors and fuel injectors stay activated in block 56. In block 58, electronic engine controller 14 sends a signal to theft control module 10 in confirmation of receipt of the engine enable signal.

What is claimed is:

1. A security system for an automotive vehicle having an engine, the security system operatively connected between engine running electrical components which are connected to an electrical power source and a lock switch having at least two operative positions, the system comprising:

a lock switch operator;

a memory device carried on said lock operator having a first security code; and a theft control module having a memory storing a second security code operatively connected between the switch and the engine running electrical components for comparing said first and second security codes, said theft control module operative to first permit the engine running electrical components to enable the starting of the engine and after comparing said first and second security codes and finding said first security code not equal to said second security code, disconnecting the engine running electrical components from the electrical power source thereby disabling the engine.

2. A security system as recited in claim 1 wherein said engine running electrical components comprise an engine control module connected to said theft control module, said theft control module selectively permitting said engine control module to control the operation of said engine by providing a control signal to said engine control module which enables and disables the engine.

3. A security system as recited in claim 2 wherein said control signal is a unique digitally encoded signal.

4. A security system as recited in claim 1 wherein said lock operator includes a transponder, said transponder retaining said first security code.

5. A security system as recited in claim 1 wherein said engine running electrical components comprise a fuel pump and fuel injectors, said engine being disabled upon deactivating said fuel pump and said fuel injectors.

6. A security system as recited in claim 1 wherein said lock switch is a rotatable ignition lock.

7. A method for operating a security system for an automotive vehicle having an engine with engine running electrical components, said security system having a theft control module, a lock switch having a selected position providing power to the engine running electrical components to run the engine, a lock operator with a first security code and a memory in said theft control module having a second security code, said method comprising the steps of:

placing said lock operator in said switch in said selected position;

starting the engine;

thereafter, comparing said first security code with said second security code; and if said first security code does not equal said second security code, disconnecting power to said engine running electrical components thereby stopping said engine.

8. A method for operating a security system as recited in claim 7 wherein the engine running electrical components include a fuel pump and fuel injectors, said step of disconnecting comprises the step of preventing supply of power to said fuel pump and fuel injectors.

9. A method for operating a security system as recited in claim 7 wherein the engine running electrical components include an electronic engine controller operatively disposed between said engine and said security system controlling operation of the engine, and before the step of disconnecting, providing a control signal to initiate said disconnecting step.

10. A method for operating a security system as recited in claim 7 further comprising verifying the starting of engine has started before the step of comparing.

11. A method for operating a security system as recited in claim 10 wherein the step of verifying the engine has started comprises monitoring said engine speed and waiting until said engine speed reaches a predetermined speed.

12. A method for operating a security system as recited in claim 11 wherein said predetermined speed is 400 revolutions per minute.

13. A method for operating a security system as recited in claim 11 wherein after the step of monitoring and waiting until the engine speed reaches a predetermined speed, waiting a predetermined time period before the step of comparing.

14. A method for operating a security system as recited in claim 7 further comprising the step of waiting a predetermined time period before the step of comparing.

15. A method for operating a security system as recited in claim 14 wherein said automotive vehicle has an electrical system having a transient time period after energizing and wherein said predetermined time period corresponds to a time greater than said transient time period.

16. A method for operating a security system as recited in claim 7 wherein said lock operator has a transponder including said memory storing said first security code, and wherein before the step of comparing, energizing said transponder.

17. A method for operating a security system for an automotive vehicle having an engine with engine running electrical components including an electronic engine controller and a lock switch having a selected position providing power to the engine running electrical components to run the engine, said security system having a theft control module operatively connected between the electronic engine controller and the lock switch, the theft control module having a memory storing a first security code and a lock operator having a second code, said method comprising the steps of:

placing said lock operator in said switch in said selected position;

starting the engine;

operating said engine controller to interrogate said theft control module for a theft status;

sending an engine enable signal or engine disable from said theft control module in response to interrogation by said engine control module;

operating said theft control module to interrogate said lock operator for said second security code;

receiving said second security code into said theft control module;

comparing said first security code with said second security code;

operating said theft control module to send an engine disable signal to said electronic engine controller if said first security code is not equal to said second security code; and disabling said engine.

18. A method for operating a security system as recited in claim 17 further comprising the step of operating said electronic engine controller to send a confirmation signal to said theft control module after said engine has been disabled.

19. A method for operating a security system as recited in claim 17 wherein said engine enable signal is a unique digitally encoded signal.

20. A method for operating a security system as recited in claim 17 wherein the engine has a fuel pump and fuel injectors and wherein, before said step of disabling, disconnecting power to said fuel pump and fuel injectors.

\* \* \* \* \*